Oct. 14, 1969    W. F. SHRIVER ET AL    3,472,042
EVAPORATIVE CONDENSER

Filed Sept. 1, 1967    12 Sheets-Sheet 1

INVENTORS,
WILLIAM F. SHRIVER
JOHN T. SANDERS III
JOHN A. PIKE
HENRY W. ANGLE

ATTORNEY

INVENTORS,
WILLIAM F. SHRIVER
JOHN T. SANDERS III
JOHN A. PIKE
HENRY W. ANGLE
BY
ATTORNEY

Oct. 14, 1969   W. F. SHRIVER ET AL   3,472,042
EVAPORATIVE CONDENSER
Filed Sept. 1, 1967   12 Sheets-Sheet 7

INVENTORS
WILLIAM F. SHRIVER
JOHN T. SANDERS III
JOHN A. PIKE
HENRY W. ANGLE
BY
Arthur Frederick
ATTORNEY

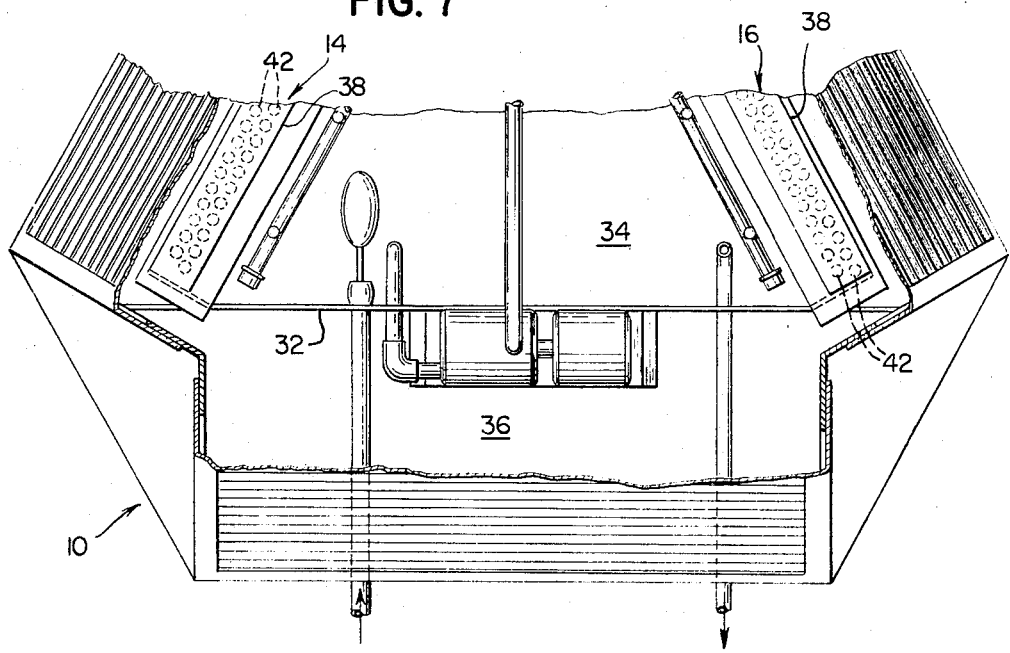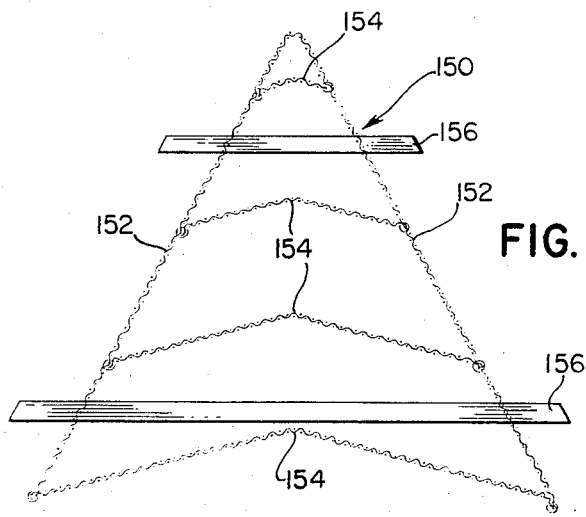

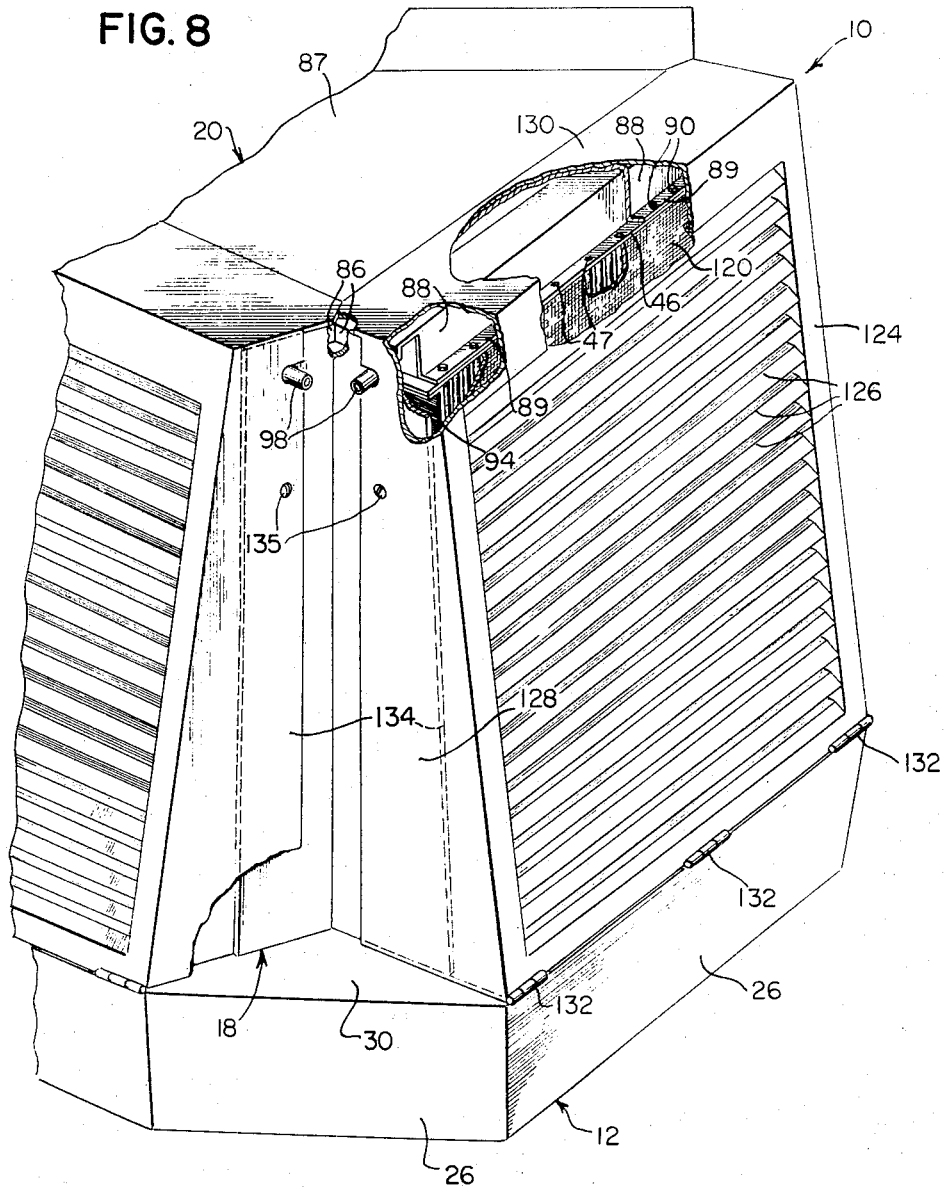

INVENTORS
WILLIAM F. SHRIVER
JOHN T. SANDERS III
JOHN A. PIKE
HENRY W. ANGLE
BY
ATTORNEY

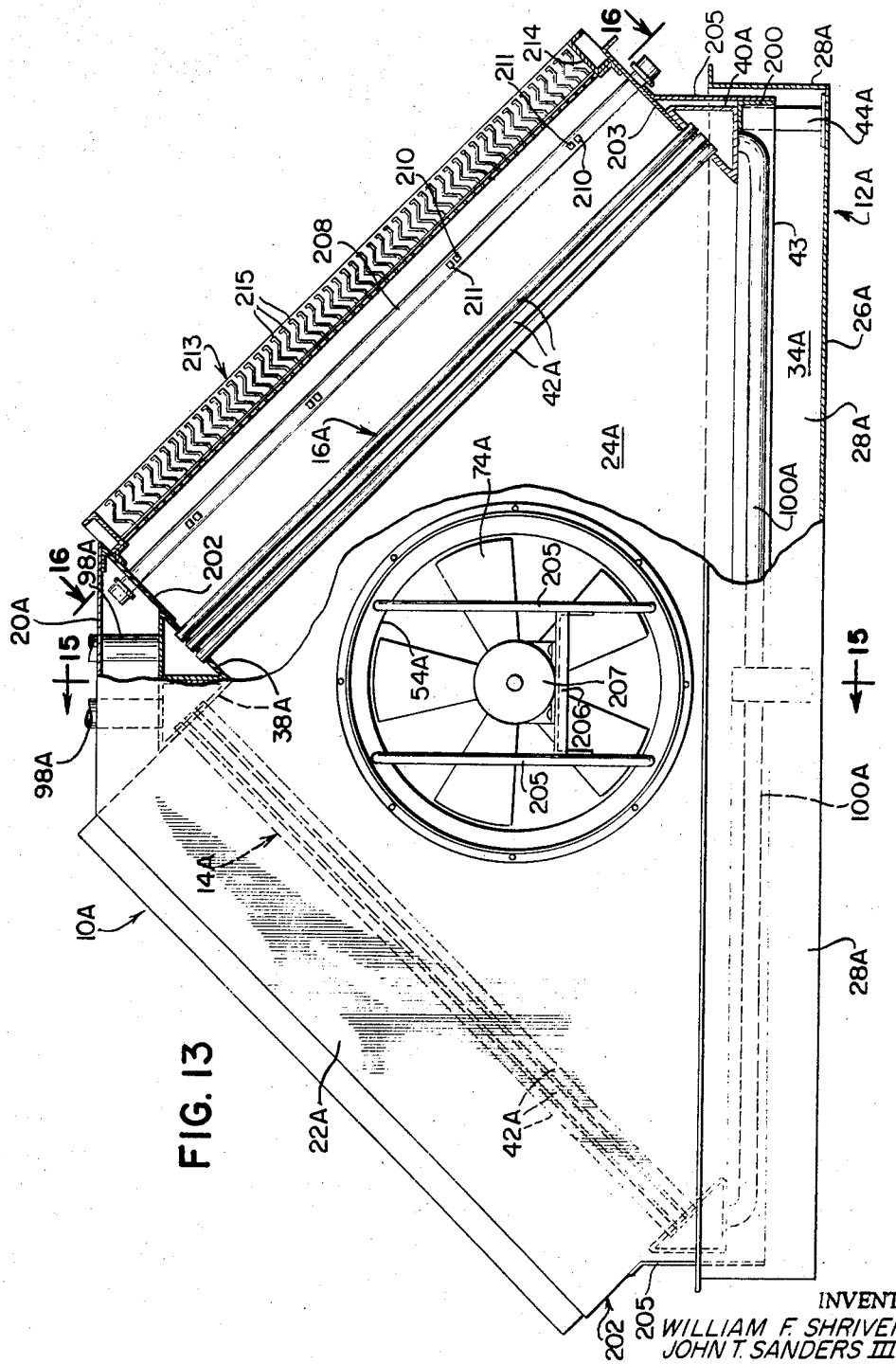

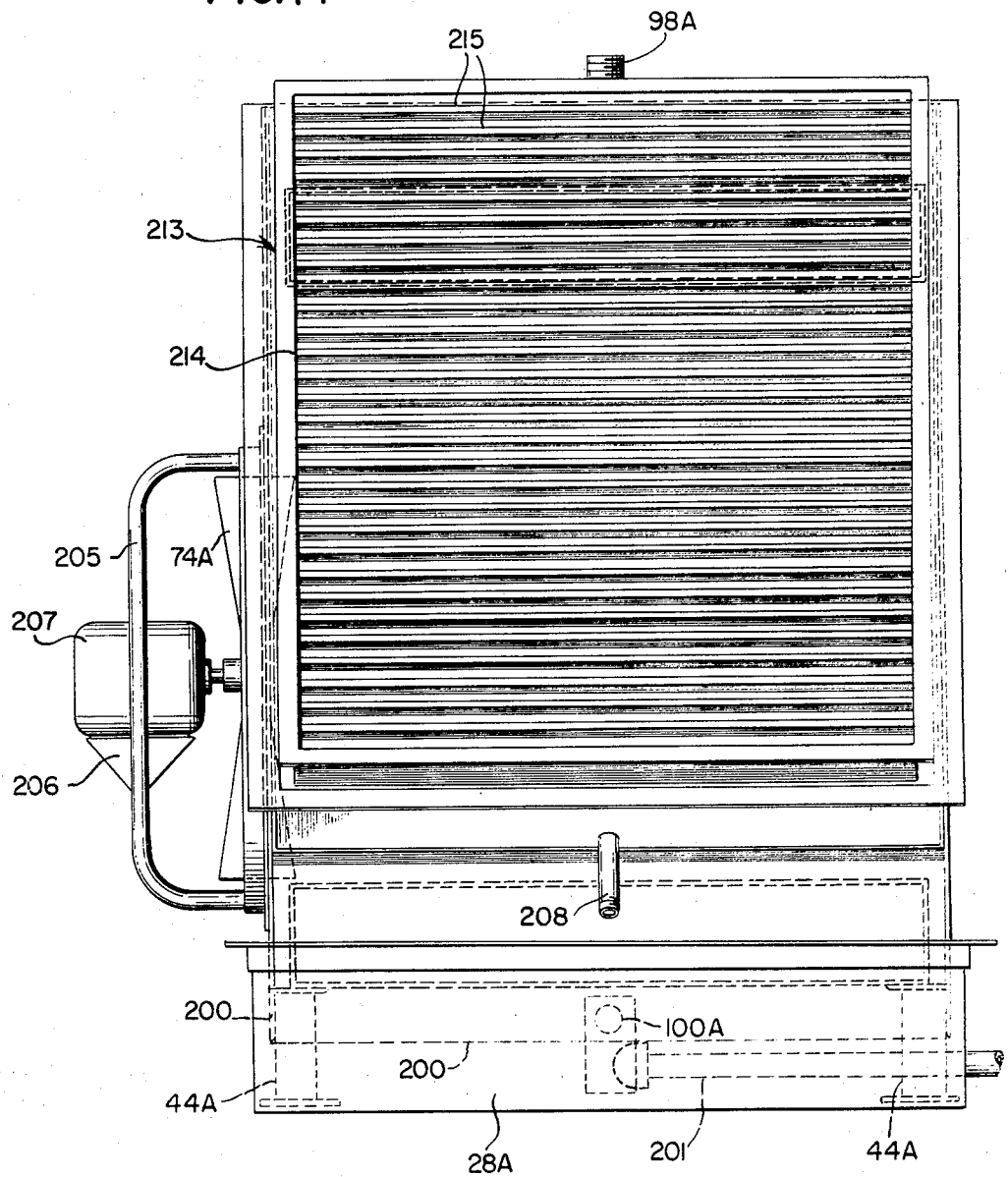

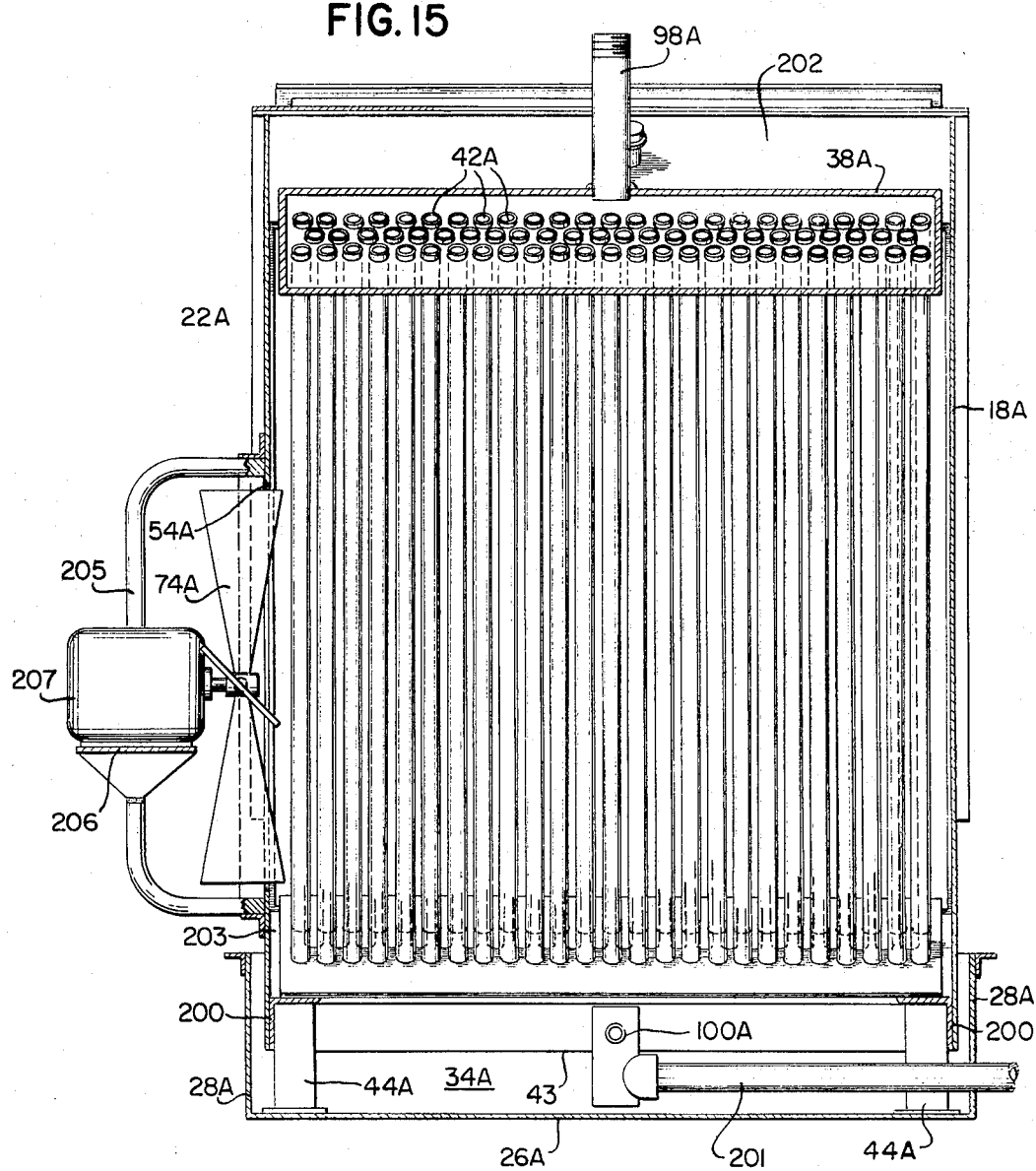

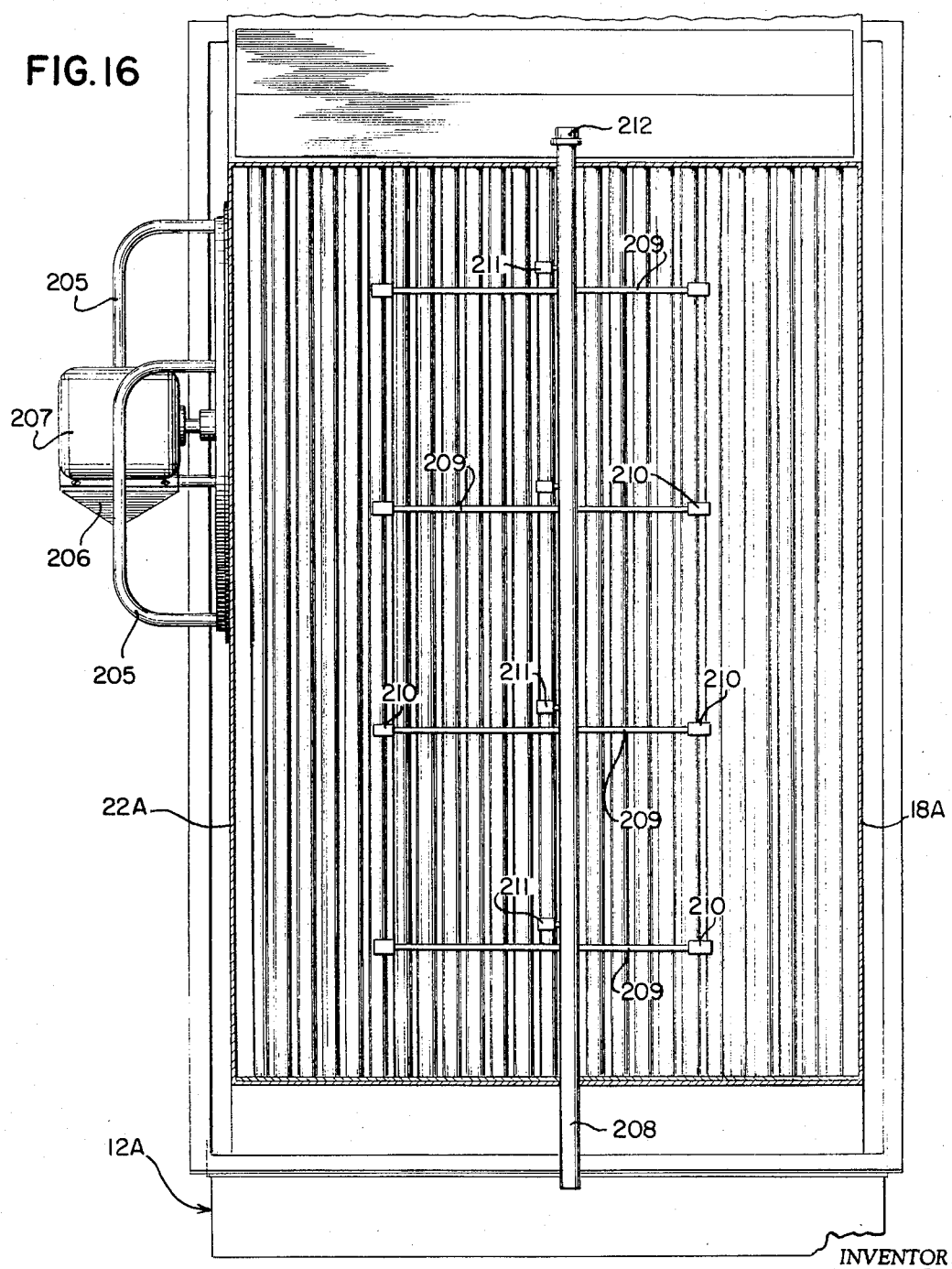

United States Patent Office 3,472,042
Patented Oct. 14, 1969

3,472,042
EVAPORATIVE CONDENSER
William F. Shriver, Waynesboro, Pa., John T. Sanders III, Highfield, Md., and John A. Pike and Henry W. Angle, Waynesboro, Pa., assignors to Frick Company, Waynesboro, Pa., a corporation of Pennsylvania
Filed Sept. 1, 1967, Ser. No. 665,080
Int. Cl. F28d 3/02; F28f 13/12, 9/00
U.S. Cl. 62—305                 26 Claims

ABSTRACT OF THE DISCLOSURE

The evaporative cooler or condenser comprises a base constructed and arranged to define a sump and two spaced banks of tubes supported by the base in converging-diverging planes. The tube banks and other walls contiguous with the tube banks and the base define with the base a plenum. At least one fan is mounted in one of the walls to draw ambient air into the plenum and force the air in two streams through the two spaced tube banks and in indirect heat exchange relationship with fluid delivered to the tube banks.

---

This invention relates to heat exchange apparatuses employing volatile refrigerant liquid which may be used for heating or cooling of water, air, or of other gases or liquids, as in heat-pumps, refrigeration, air conditioning or ice-making or the like and is more particularly concerned with heat exchangers of the evaporative type.

Heretofore, air-cooled or evaporative surface condensers, into which a gaseous stream of refrigerant is passed in indirect heat exchange relationship with a stream of air which vaporizes water contacting the surfaces of the refrigerant conducting tubes or coil to thereby condense the gaseous refrigerant within the tubes, have been relatively large, cumbersome and expensive apparatuses in relation to capacity. In many of the presently known evaporative condensers, relatively high horsepower fans in relation to condensing capacity are required to overcome the large air pressure drop through the tube bank or coil and provide the necessary quantity of air flow across the coils. Another disadvantage of present evaporative condensers is the problem of sealing the flow area through the coil to prevent the bypass of air around the coil.

Accordingly, it is an object of the present invention to provide an improved evaporative type heat exchanger for cooling or condensing a gas or liquid which is of relatively simple, compact construction requiring a minimum of sheet metal.

It is another object of this invention to provide an evaporative type heat exchanger for cooling or condensing a gas or liquid in which a higher heat transfer efficiency is achieved through improved wetting of the heat transfer surfaces.

It is a further object of the present invention to provide an evaporative condenser in which fan horsepower is less than in conventional evaporative condensers of comparable capacity.

A still further object of this invention is to provide an evaporative type surface condenser in which motors and pumps are enclosed, but are readily accessible along with other internal components for inspection and/or repair.

Another object of this invention is to provide an evaporative condenser which combines the efficiency of the vertical shell and tube condenser, the subcooling advantages of the horizontal shell and tube condenser with the water saving feature of the evaporative type surface condenser.

A further object of the present invention is to provide an evaporative type surface condenser of such configuration that it can be readily combined with like condensers into assemblies of increased capacities.

A feature of the present invention is the disposition of the lower ends of the tube banks in liquid hold-up in the sump to thereby simply and effectively seal the lower ends of the coils against bypass of air.

Another feature of this invention is the construction and arrangement of the base and tube banks so that a portion of the tube banks is submerged in the liquid hold-up in the sump and thereby provide subcooling of the cooled fluid flowing through the tube banks.

A still further feature of this invention is the provision of two laterally spaced tube banks and dividing the air stream into a branch for each bank so that a relatively short path of travel of air is required and hence a low pressure drop is achieved, thereby permitting the use of a smaller, lower horsepower fan than would be required in a conventional unit of the same condensing capacity.

In view of the foregoing, the present invention contemplates a novel evaporative type heat exchanger for cooling or condensing a gas or liquid, which heat exchanger in one embodiment comprises a base forming a reservoir and two banks of tubes supported by the base and arranged in converging-diverging vertical planes in relation to each other to form two side walls of the apparatus. A first wall means is disposed to seal the adjacent divergent end of the tube banks while a second wall means is disposed adjacent the convergent ends of the tube banks. The two banks, the first and second wall means, together with a top plate and the base, define a plenum or chamber. A fan or blower means is disposed to force ambient air into the plenum and through the two tube banks and, thereby, in indirect heat exchange relationship with fluid to be cooled or condensed which is delivered to the tube bank. Water spray means is disposed within the chamber adjacent the tube banks to achieve wetting of the tubes. The banks of tubes are connected to a source of fluid to be cooled and/or condensed and to a place of use or storage of the cooled or condensed fluid. Draft eliminating means may be provided adjacent the two side walls formed by the tube banks to prevent recirculation of discharged air back into the unit.

In another embodiment of this invention the evaporative type heat exchanger comprises a horizontal base forming a reservoir and two banks of tubes arranged in converging-diverging planes which lie at acute angles with respect to the horizontal base and with the apex formed by the tube bank positioned above the base. Upright walls extend between the two tube banks and the base to form a plenum. A fan or blower is disposed in at least one of the upright walls to force ambient air into the plenum and through the two tube banks and, thereby, in indirect heat exchange relationship with fluid to be cooled or condensed which is delivered to the tube banks. Water spray means is provided adjacent the exterior surface of the tube banks to achieve wetting of the tubes. The banks of tubes are connected to a source of fluid to be cooled and/or condensed and to a place of use or storage of the cooled or condensed fluid. Draft eliminating and disentrainment means provided exteriorly of each of the tube banks to remove moisture entrained in the air stream and prevent recirculation of discharged air back into the unit.

In another alternative embodiment of this invention, a baffle means, such as a screen-like structure, may be employed to effect substantially uniform distribution of the air through the tube banks.

Also as a further embodiment of the present invention, substantially uniform distribution of air can be achieved by providing a plurality of spray nozzles across the face of the tube banks and adjusting the density of the water spray emitted by the nozzles to create a water screen of varying density.

In a still further embodiment of this invention the two banks of tubes are arranged in converging-diverging vertical planes in relation to each other so that a further saving of sheet metal is achieved and no internal baffling or varying the density of the water screen for air distribution is necessary.

The previously mentioned objectives and features and other objectives and advantages of this invention will appear more fully hereinafter from a consideration of the detailed description which follows when taken together with the accompanying drawings wherein various embodiments of the invention are illustrated by way of example and in which:

FIG. 7 is a fragmentary top plan view of the apparatus with parts removed to more clearly show the water pump and motor chamber;

FIG. 8 is a fragmentary rear view in perspective of the evaporative surface condenser shown in FIGS. 1 and 2 with parts broken away to better show various features of the apparatus;

FIG. 11 is a top plan view of an air distribution screen which forms a part of another embodiment of this invention;

FIG. 13 is an elevational view with parts broken away of an evaporative surface condenser according to another embodiment of this invention;

FIG. 14 is a side elevational view of the embodiment shown in FIG. 13;

FIG. 15 is a cross sectional view taken substantially along line 15—15 of FIG. 13; and FIG. 16 is a view in cross section taken substantially along line 16—16 of FIG. 13.

Figure 1:
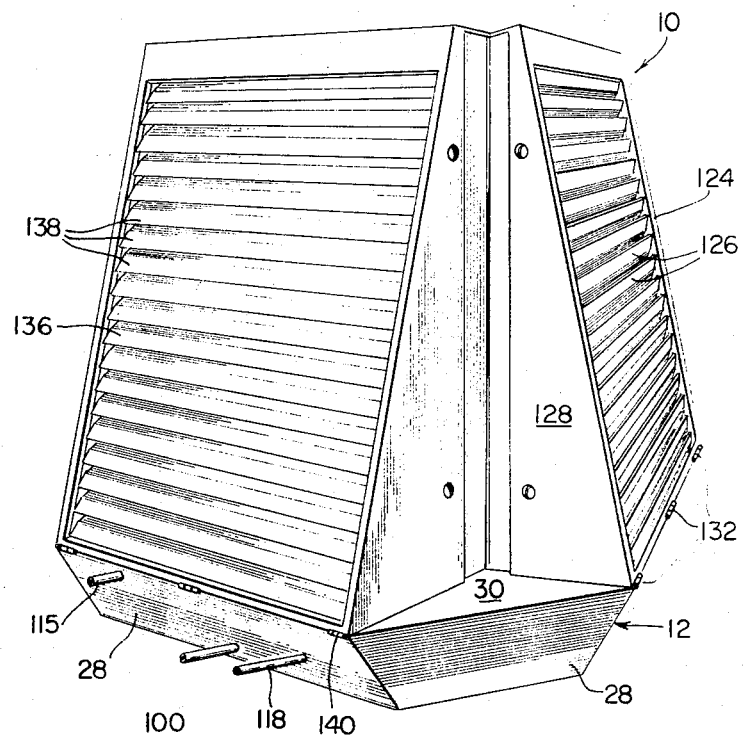
FIG. 1 is a view in perspective of the evaporative surface condenser according to one embodiment of this invention.

While the invention is shown and will be described with regard to an evaporating surface condenser, it is to be understood that the invention has application to any type heat exchanger where heat transfer is to be achieved between atmospheric or ambient air and a fluid flowing through passageway means, such as tubes.

Now referring to the drawings, the reference number 10 designates the evaporative surface condenser according to this embodiment of the invention which comprises, in general, a base 12, two banks of vertical tubes 14 and 16, a sealing means or rear wall 18, top plate 20 and front wall 22 interconnected to define therebetween a substantially triangular plenum or chamber 24.

As illustrated, base 12 comprises a bottom plate 26, contiguous inclined side wall sections 28, and three triangular shaped cover sections 30, each of which is connected to the top edge of a section 28 along its hypotinuse edge. A partition 32 is disposed to extend across the base in spaced, parallelism with side wall section 28 and below front wall 22 to thereby divide base 12 into a reservoir or sump 34 and a dry space or chamber 36.

Figure 4:
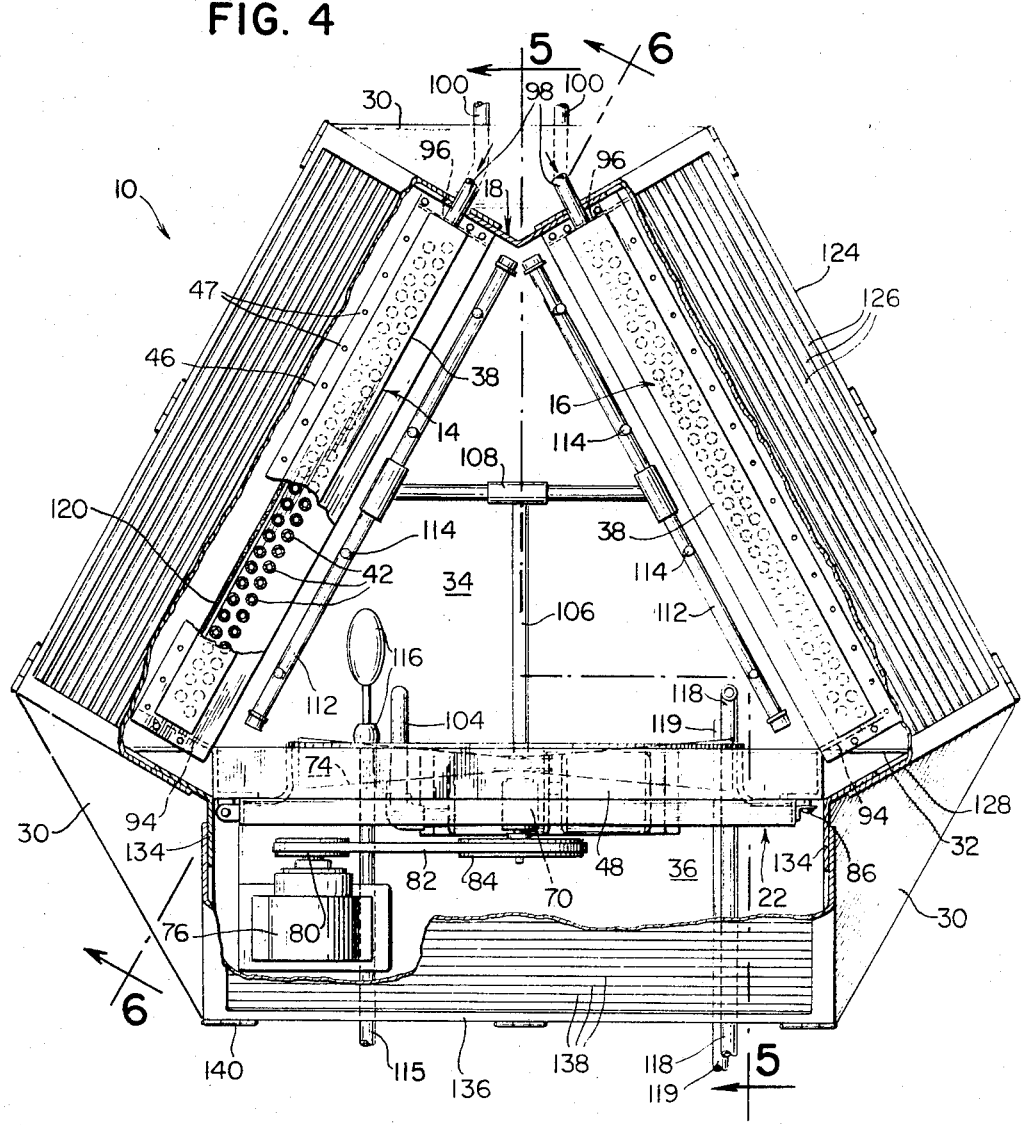
FIG. 4 is a top plan view of the evaporative surface condenser shown in FIG. 1 also with parts removed for purposes of illustration.
Figure 5:
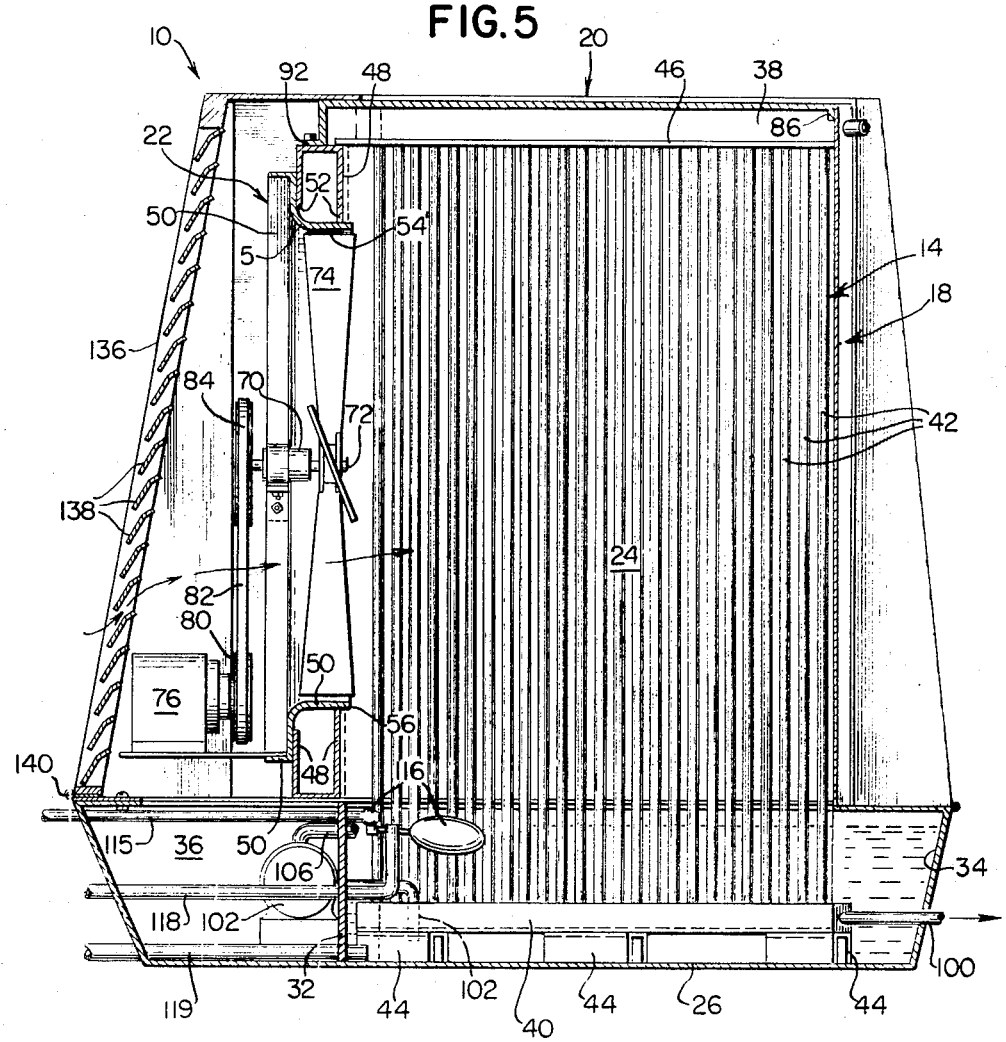
FIG. 5 is a cross sectional view taken substantially along line 5—5 of FIG. 4.
Figure 6:
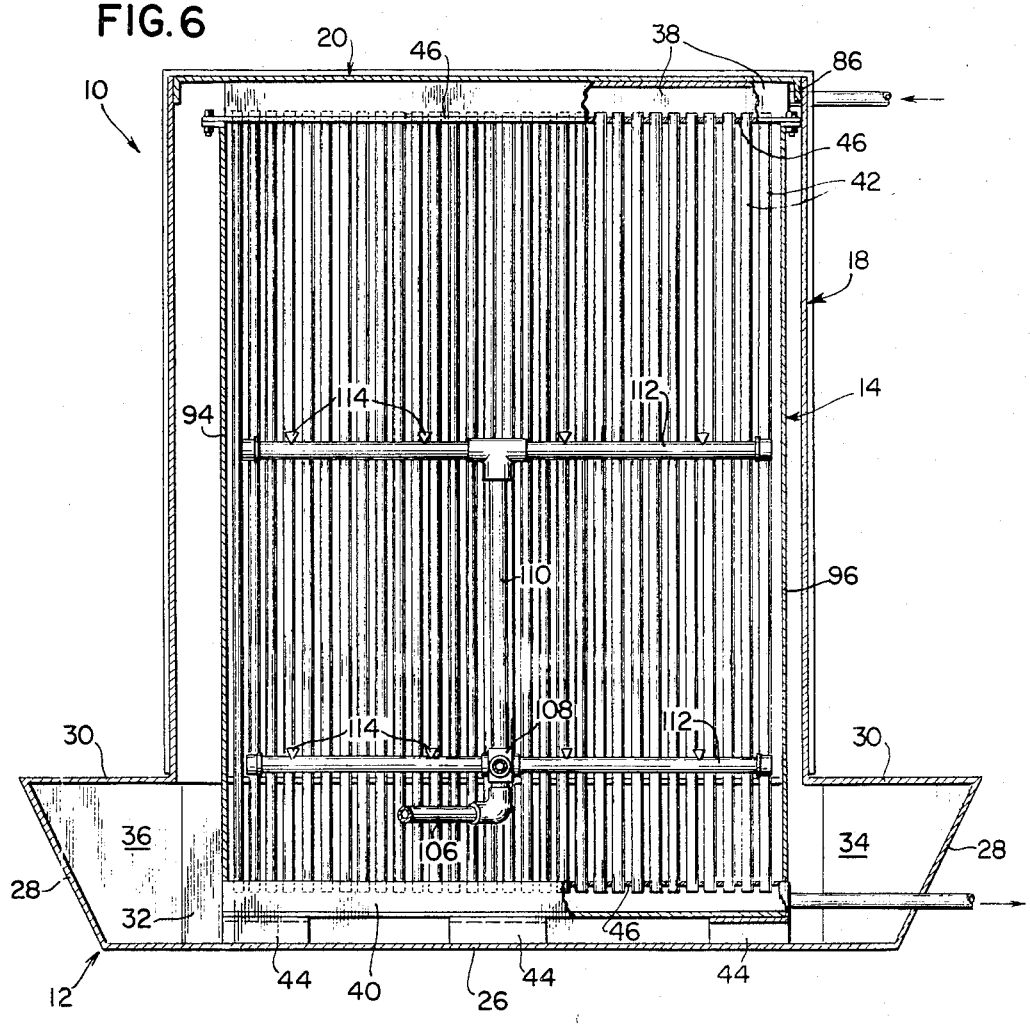
FIG. 6 is a view in cross section taken substantially along line 6—6 of FIG. 4.

Each of the banks of vertical tubes 14 and 16 comprise an inlet header 38 and an outlet header 40 interconnected by a plurality of spaced, parallel tubes 42. As best shown in FIG. 4, tube banks 14 and 16 are disposed in relation to each other in converging-diverging vertical planes with the convergent ends adjacent rear wall 18 and the divergent ends adjacent front wall 22. Each of the tube banks is mounted on bottom plate 26 within sump 34 by a plurality of inverted U-shaped piers 44. Piers 44 are suitably secured, as by bolts or welding, to the underside of outlet header 40 and to bottom plate 26. While two rows of laterally off-set tubes 42 are shown in the drawings, more than two rows of tubes may be employed without departure from the scope and spirit of this invention. Also without deviating from the scope and spirit of the present invention more than one set of inlet and outlet headers may be provided in the apparatus. While tubes 42 are shown as bare tubes, some or all of the tubes may have extended surface elements or fins without departure from the scope and spirit of this invention. One advantage to the use of bare tubes is that obstruction to the downward flow of water along the outer peripheral surfaces of the tubes is avoided and thereby adequate wetting of the tubes and maximum benefit of heat absorption through the heat of vaporization of the water is assured. It is also possible to employ tube banks, each of which comprise vertically extending headers interconnected by substantially horizontal tubes such as shown in U.S. Patent No. 2,274,034. As best shown in FIGS. 5 and 6 the headers 38 and 40 may be of any suitable construction, but are shown herein as box shaped members with the tube sheet 46 welded or otherwise connected in a fluid tight manner to the pairs of spaced parallel walls which partly define each of the headers. Tube sheets 46 of the inlet headers 38 are larger in dimension than the other walls defining the headers so that a peripheral lip mounting or flange portion is formed around headers 38. The mounting flange is provided with a plurality of spaced holes 47 to receive mounting bolts as hereinafter more fully described.

Figure 3:
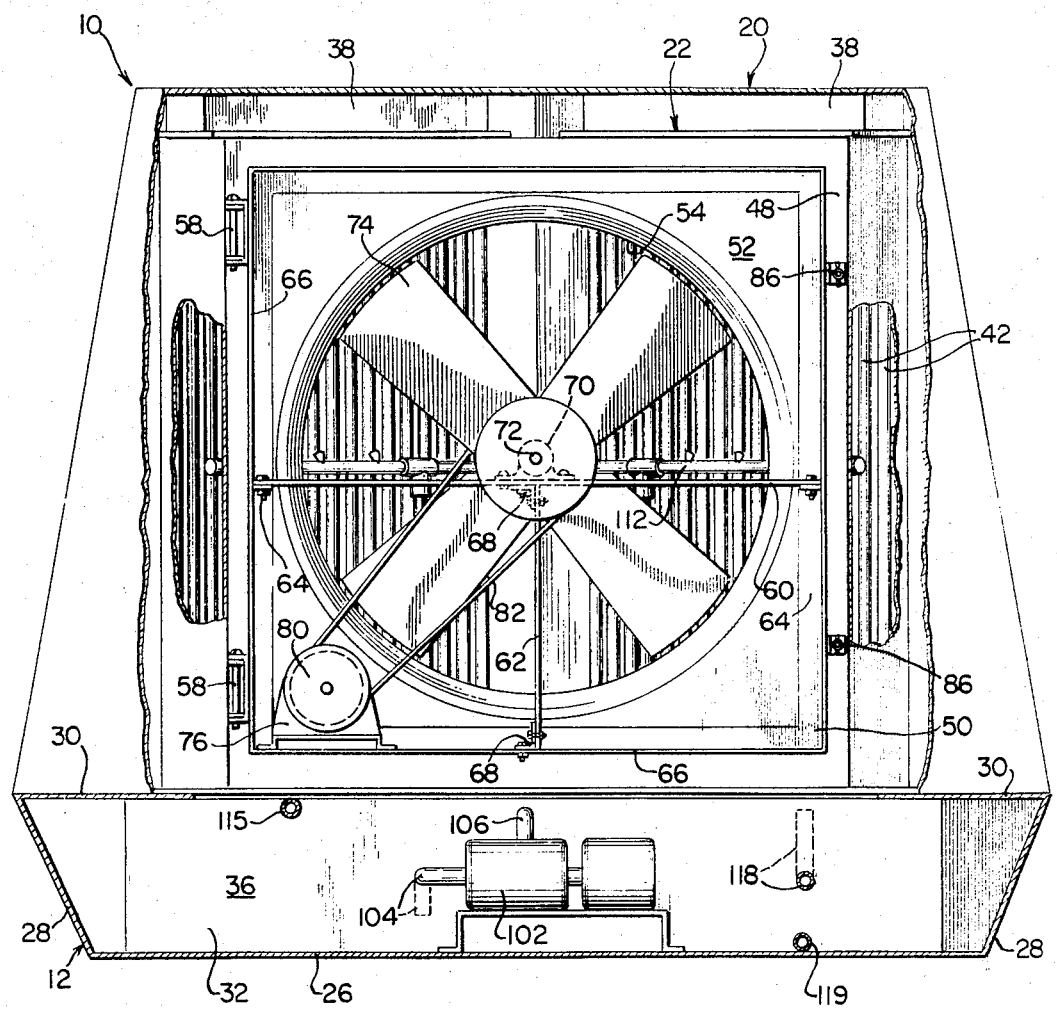
FIG. 3 is a front elevational view of the evaporative surface condenser shown in FIGS. 1 and 2 with parts broken away for illustrative purposes.

The front wall 22, as best shown in FIGS. 3, 4 and 5, comprises a rectangular shaped frame 48 to which is hinged a fan support structure 50. The frame 48 has an opening 52 therein. The fan support structure 50 includes a circular aperture 54 defined by an axially projecting flange portion 56. The support structure 50 is mounted on vertical hinges 58, one part of which is secured to frame 48 and the other part to support structure 50 so that flange portion 56 defining aperture 54 projects into opening 52 in frame 48. A bearing support consisting of a horizontal brace 60 and a vertical brace 62 is connected to and forms part of the fan support structure 50. The brace 60 is connected at opposite ends by bolts 64 to the forwardly projecting flange portion 66 of structure 50, while brace 62 is bolted at one end through L-shaped brackets 68 to the central portion of brace 60 and at the opposite end to flange portion 66. Bolted, or otherwise suitably secured to horizontal brace 60, is a bearing 70 for supporting a shaft 72 of a fan 74 for rotation. To rotate fan 74, a drive motor 76, such as an electric motor, is mounted on a base 78 which is connected to support structure 50. The motor 76 is drivably connected to fan 74 by a belt and pulley drive which consists of a drive pulley wheel 80 connected through a belt 82 to a driven pulley wheel 84 keyed to the opposite end of shaft 72 from fan 74. Since the fan 74 and the drive assembly for the fan is mounted on support structure 50, which is hingedly secured to frame 48, access to the interior of chamber 24 for inspection and/or repair can be achieved quickly and easily by merely swinging the fan support structure 50 on hinges 58 away from frame 48. The fan support structure 50 may be secured in a closed position by two wing-nuts 86 or by other suitable means.

Figure 2:
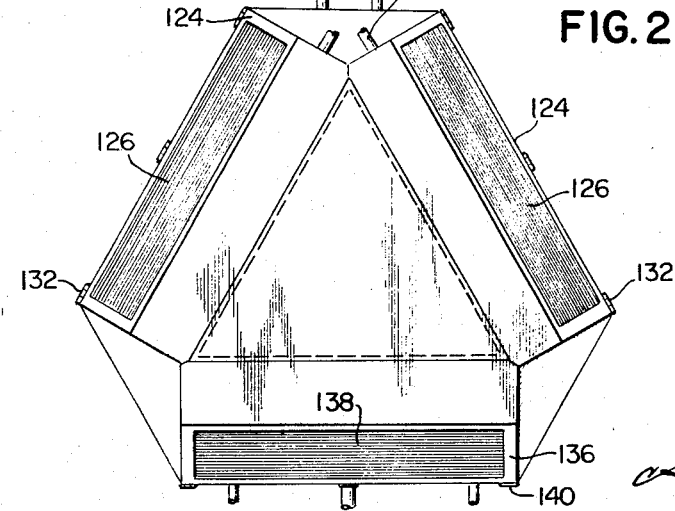
FIG. 2 is a top plan view of the evaporative condenser shown in FIG. 1.

The sealing means or rear wall 18, as best shown in FIGS. 2, 4 and 6, is a plate having a vertically extending longitudinal crease so that it has a V-shape in cross-section. The bottom edge of wall 18 is welded, or in some other suitable manner secured, to the inner edges of the adjacent cover section 30 of base 12 (see FIGS. 5 and 8). The upper portion of wall 18 is secured by welding or other fluid tight means to the depending flange portion 86 of top plate 20 (see FIGS. 6 and 8).

The top plate 20 comprises a sheet of generally triangular configuration having a flat portion 87, an integral depending portion 88 adjacent each of the inlet headers 38, and integral horizontal flange portion 89, all of which portions are dimensioned so that the flat portion 87 abuts the tops of headers 38, depending portion 88 extends adjacent the outer sides of the inlet headers and flange portion 89 overlies the mounting flange portion of tube sheet 46. The flange portion 89 of top plate 20 is provided with a plurality of spaced bolt holes which register with bolt holes 47 in the mounting flange portion of tube sheet 46 and receive bolts 90 therethrough. To provide a better fluid tight joint a gasket (not shown) may be interposed between the tube sheet mounting flange and flange portion 89. The top plate adjacent the front wall 22 is provided with a depending portion and a horizontal mounting flange 92 (see FIG. 5) which is bolted or otherwise secured in a fluid tight manner to the upper portion of frame 48 of front wall 22. This positive, fluid tight connection between top plate 20 and tube sheet 46 of inlet headers 38 rear wall 18 and front wall 22 prevents any more than negligible air bypass of tubes 42.

To assist in directing air flow between tubes 42, each of the tube banks 14 and 16 may be provided with baffle plates 94 and 96, which plates are disposed to extend adjacent the bank of tubes and vertically between inlet headers 38 and outlet header 40 (see FIGS. 4 and 6).

Supply of fluid to be cooled or condensed, such as gaseous refrigerant, is conducted into the interior of inlet headers 36 from a source thereof (not shown) by way of inlet connections 98 which extend horizontally through end wall 18 and into the end walls of the inlet headers. Of course, two or more inlet connections can be provided and/or disposed to project through top plate 20 without departure from the scope and spirit of this invention.

The removal of cooled or condensed fluid from each of the outlet headers 40 is achieved by outlet connections 100 which are shown as extending from the end wall of the headers horizontally through rear, side wall section 28 of base 12. Of course, more than one outlet connection for each outlet header may be provided and may extend in any convenient direction without deviating from the spirit and scope of the present invention.

To derive the advantages of absorption of heat by the vaporization of water, the apparatus 10 is preferably provided with a tube wetting assembly which comprises a water pump 102 and water distribution means. Of course, wetting of the tubes, while less desirable than as herein illustrated and described, may be achieved by other suitable means such as by drip pans and the like shown in United States Patents No. 2,509,031 and No. 2,583,149. As best shown in FIGS. 3, 4 and 5 pump 102 may be driven by an electric motor both of which are disposed in dry space or chamber 36 in base 20. An inlet connection or suction line or pipe 104 is connected at one end to the suction side of pump 102 and at the opposite end communicates with sump 34 to receive water from the latter. The outlet or pressure side of pump 102 is connected to a main feed line or pipe 106 which connects at the opposite end with a main lateral branch pipe 108 where the fluid flow is split in two streams. As best shown in FIG. 6, each of the opposite ends of branch pipe 108 is connected to a vertical feed pipe 110. Connected to vertical feed pipe 110 is one or more vertically spaced spray manifolds 112. Each of the spray manifolds is provided with a plurality of spaced nozzles 114, which are disposed to emit a stream of water upwardly. While tubes 42 can be wetted by entrainment of water in the air stream flowing through the tubes, it has been found more effective to direct the nozzles toward the tubes 42 as well as upwardly. This latter nozzle arrangement insures the proper wetting of the rows of tubes beyond the tube row nearest the nozzles. Make-up feed water is provided by a supply pipe 115 which extends horizontally through walls 28 and partition 32 to communicate with the upper portion of sump 34. The flow through supply pipe 115 is controlled by a float controlled valve 116 so that water is fed into sump 34 in response to fluctuation of the water level. The possibility of excess water developing in sump 34 is prevented by an overflow drain pipe 118 (see FIGS. 4 and 5). The water hold-up or reservoir in sump 34 serves as a seal for the lower portion of plenum 24 and prevents bypass of air around the lower portions of tube banks 14 and 16. To provide for complete drainage of sump 34, a drain line or pipe 119 is provided with one end in communication with the bottom portion of sump 34. A normally closed valve, not shown, is disposed in drain pipe 119 to control flow therethrough.

Figure 10:
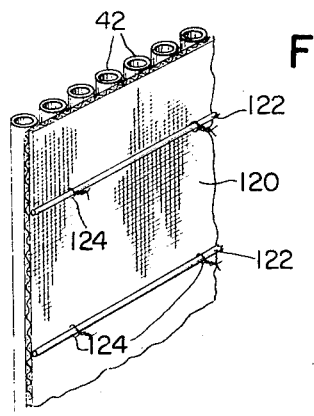
FIG. 10 is a fragmentary view in perspective showing the means for disentraining water carry-over.
Figure 9:
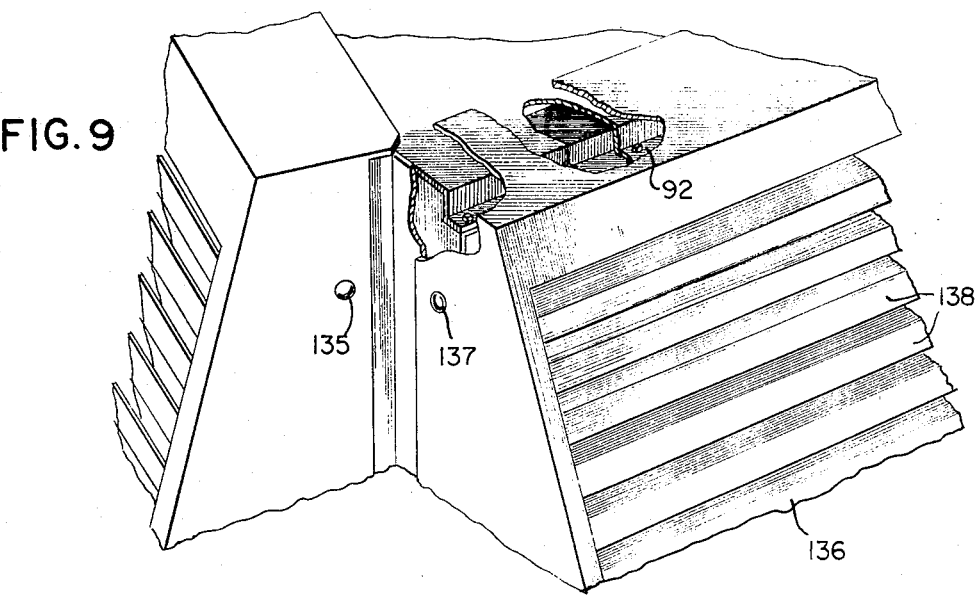
FIG. 9 is a fragmentary perspective view of the seal plate between the front and side walls with parts broken away for purposes of illustration.

The loss of water from the apparatus 10 by water entrained in the air stream passing through tube banks 14 and 16 is minimized by disentrainment or demisting means. As best illustrated in FIGS. 4, 8 and 10, the disentrainment or demisting means maybe screens 120 disposed adjacent the outer row of tubes of tube banks 14 and 16. Each of the screens 120 may comprise a sheet of porous, fibrous plastic material held to the outer row of tubes 42 by a plurality of vertically spaced rods 122 extending horizontally along the outer surface of the screen and secured to the tubes by tie means extending through the screen, such as wire 124 looped around both the rods and the tubes. The detrained water flows down along the screen and eventually drips into sump 34 along with the unevaporated water which has flowed downwardly along the surface of tubes 42.

Since ambient wind conditions can interfere with the efficiency of the apparatus 10 according to this invention as thus far described, a draft elimination means is provided adjacent each of the tube banks 14 and 16 and front wall 22. As shown, each of the draft elimination means adjacent tube banks 14 and 16 comprises a rectangular cover 124 having a plurality of louvers 126 which are constructed and arranged to direct the discharging air upwardly. The rectangular cover 124 also includes integral side members 128 and a top member 130. The cover 124 is connected by hinges 132 along its lower edge to base 12 so that it can be quickly and easily swung to a non-obstructing position to permit access to the tube banks for inspection or repair. The cover 124 is dimensioned so that, when closed, side members 128 overlap and abut rear wall 18 and a vertical seal plate 134 secured to a cover section 30 and top plate 20. Also when the cover is closed, top member 130 of the cover overlaps and abuts top plate 20. Cover 124 is held in a closed position by any suitable means such as flat headed screws 135 projecting through holes in side members 128 and turned into a nut (not shown) welded to seal plates 134 and rear wall 18.

As best shown in FIG. 5, the draft eliminating means adjacent front wall 22 is similar in construction to covers 124 and comprises a cover 136 having louvers 138 which are constructed and arranged to admit ambient air upwardly into the apparatus. The cover 136 is also secured by hinges 140 along its lower edge to base 12 so that it can be swung out of the way to permit access to the interior of the apparatus. The cover 134 also has side and top members which, when the cover is closed, overlaps and abuts the surfaces of seal plates 134. Flat headed screws 137, similar to screws 135, projecting through the side members of cover 136 and turned into nuts (not shown) secured to seal plates 134, may also be employed to secure cover 136 in a closed position.

Figure 12:
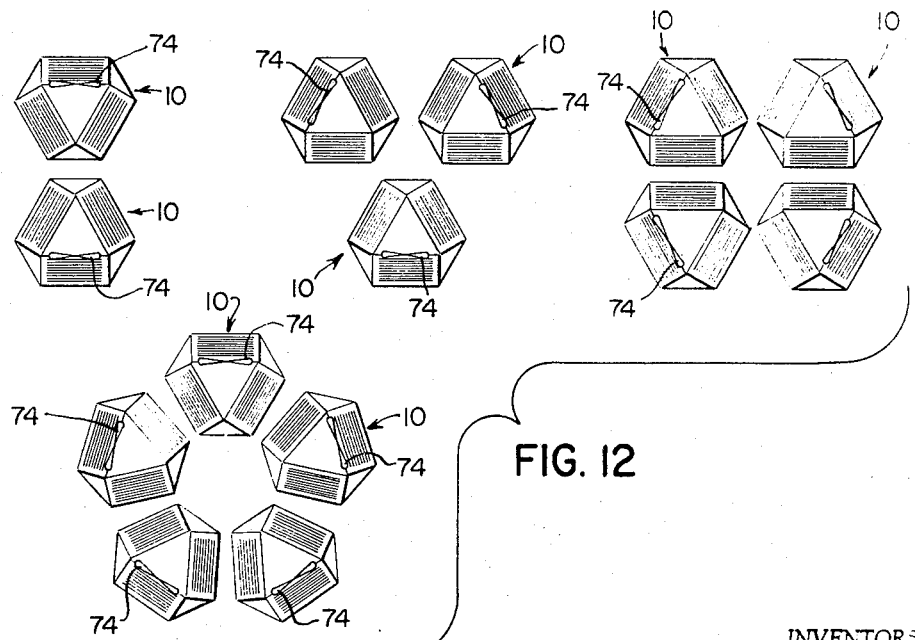
FIG. 12 is a schematic showing of various assemblies comprising multiples of the surface condensers according to the present invention.

The use of covers 124 and 136, in addition to preventing ambient winds from disrupting the efficiency of the apparatus 10, enables the apparatus to be combined in closed spaced relationship with other similar units or modules 10 as shown in FIG. 12. Obviously, air discharging from one module 10 does not enter the next adjacent module 10 since the louvers 126 of covers 124 deflect the air upwardly. Also since the louvers 138 of covers 136 are arranged to receive ambient air from an area below the top of the module, any but a negligible amount of recirculation of air discharging from covers 124 back into the same module or adjacent module is eliminated.

In operation of the evaporative surface condenser module 10 herein described, fluid to be cooled or condensed flows into inlet headers 38, via inlet connections 98, and thence into tubes 42 of tube banks 14 and 16. Simultaneously, water is pumped by pump 102 from sump 34, through suction line 104, and thence forced into and through main feed pipe 106. From feed pipe 106, the water is forced into lateral branch pipe 108 and then into vertical feed pipes 110. From each of the feed pipes 110 the water is delivered to spray manifolds 112 and then to spray nozzles 114 from which the water is discharged upwardly and toward the tubes 42. Also, simultaneously with the flow of fluid into and through tubes 42 and the wetting of the outer surfaces of tubes 42, air is drawn into the apparatus through louvers 138 and into plenum 24 by fan 74. The fan 74 is rotatively driven by a motor 76 through pulley wheel 80 connected by belt 82 to pulley wheel 84 mounted on fan shaft 72. As the air is forced into plenum 24 and between tubes 42 of tube banks 14 and 16, heat is absorbed from the tubes and from the gaseous fluid flowing into and through tubes 42, thereby cooling and condensing the gaseous fluid. The condensate is drawn from outlet headers 40, through outlet connections 100, to a point of use, such as an evaporator, or storage (not shown). Since outlet headers 40 are completely submerged in the water reservoir in sump 34, the condensate is subcooled so that, in the case of condensed refrigerant, its ability to absorb heat in the evaporator is increased, thus permitting the use of a smaller size apparatus than would be possible without subcooling. Also since the evaporative surfaces, that is tubes 42, are vertically disposed and communicate with horizontal outlet headers 40, the outlet headers 40 and the lower end portions of tubes 42 may be utilized as a receiver or accummulator, thus eliminating the necessity for a separate vessel. The tubes 42 are thoroughly wetted by virtue of direct impingement of the spray from nozzle 114, entrainment of water in the air stream passing over tubes 42 and by water flowing downwardly along the surface of the tubes. After the air flows over tubes 42, it flows through screens 120, which are disposed adjacent the outer rows of tubes 42 of tube banks 14 and 16. In flowing through screens 120, water which has been entrained in the air stream is separated from the air and returned to sump 34. From screens 120, heated air is discharged through louvers 126 of covers 124 to atmosphere. Make-up water is delivered in controlled amounts to sump 34 through supply pipe 115 and float valve 116.

It has been discovered that since the static pressure presented to the flow of air by vertical tubes 42 of tube banks 14 and 16 and the path of travel of the air is less than conventional evaporative condensers, a conservation of energy for rotating fan 74 is achieved.

It also has been found that for most apparatuses 10 according to this invention the combination of back pressures and air flow restrictions, while relatively small, provided by tubes 42, screen 120 and louvers 126 of covers 124, together with the water spray from nozzles 114, a sufficiently uniform distribution of air flow through tube banks 14 and 16 is achieved, and, therefore, mechanical baffling or other air flow directing means are unnecessary. However, for those designs, where such air flow distribution means is required, it has been found that one such effective means is the air distribution screen assembly 150 shown in FIG. 11. Screen assembly 150 comprises side walls 152 arranged in two converging-diverging vertical planes and interconnected by a plurality of spaced screens 154. The assembly is secured to two support strips 156 which are of such length that, when the assembly is placed in plenum 24, the opposite ends of strips 156 rest upon the lower spray manifolds 112. The screen 150 is of such dimensions that with the screen resting upon lower spray manifolds 112, it substantially fills plenum 24.

It is also contemplated that, in some designs, proper air distribution into tube banks 14 and 16 can be attained by adjustment of the spray nozzles 114 so that a water screen of varying density is achieved to effect air distribution.

As illustrated schematically in FIG. 12, the evaporative condenser herein disclosed can be arranged and combined with one or more like units or modules to create installations of a desired capacity quickly and easily with minimum additional expense. As shown, the evaporative condensers can be arranged in clusters of two, three, four and five module assemblies. This ability to combine modules 10 according to this invention is attributable to the substantially triangular configuration of the units and, as previously mentioned, the use of draft elimination means which are shown as louvered cover members 124 and 136 which prevent units from interfering with the efficient function of each other.

It is believed now readily apparent that the evaporative condensers described and shown in FIGS. 1 to 12, inclusive, are more efficient than conventional evaporative condensers in that they require less fan horsepower and provide for subcooling of the condensate. They are evaporative condensers wherein motors and pumps are enclosed yet are quickly and easily accessible for inspection and/or repair as are the other internal components, such as the condensing tube banks. They are also evaporative condensers in which efficient and complete wetting of all the rows of tubes is obtainable. Furthermore, they are apparatuses in which more intimate heat transfer is achieved between the water and air by reason of spraying of the water into the air stream. The evaporative condensers are also capable of being combined with like units in clusters for providing installation of increased cooling capacities.

In FIGS. 13 to 15, inclusive, is shown another embodiment of the present invention which basically differs from the embodiment shown in FIGS. 1 to 10, inclusive, in that the two converging-diverging tube banks lie in planes extending at acute angles to the base rather than in planes extending substantially perpendicular to the base. One of the advantages of this construction is that it provides a lower silhouette or head room than the embodiment shown in FIGS. 1 to 10. The parts of the evaporative condenser 10A shown in FIGS. 13 to 15 which are similar or the same as those parts of the embodiment shown in FIGS. 1 to 10 will be designated by the same reference number but with the suffix A added.

As shown in FIGS. 13 to 15, evaporative condenser 10A has a rectangular shaped base 12A which consists of a bottom plate 26A and contiguous side walls 28A to form a sump or reservoir 34A. The evaporative condenser also has two tube banks 14A and 16A which are supported by base 12A in converging-diverging relationship to each other with the converging ends of the tube banks meeting above the central portion of base 12A so that the tube banks lie in planes at acute angles to the base.

Each of the tube banks 14A and 16A comprise an inlet header 38A and an outlet header 40A interconnected by a plurality of spaced, parallel tubes 42A. The inlet and outlet headers 38A and 40A, respectively, are shown as preferably of triangular construction in cross section, but obviously may be square, round or of any other cross sectional configuration without departure from the scope and spirit of this invention. The outlet headers 40A are supported to partially lie in sump 34A by piers or support columns 44A which are connected to bottom plate 26A and, at the opposite end, to a rectangular shaped support frame formed of angle irons 200. The inlet headers 38A rest in abutment against each other, as best shown in FIG. 13. To supply fluid to each of the inlet headers 38A, a fluid supply pipe 98A is connected to each of the inlet headers. Fluid is conducted away from each of the outlet headers 40A by a discharge branch pipe 100A which is connected at one end to an outlet header and, at the opposite end, to a main discharge pipe 201.

Obviously as an alternative construction, each of the tube banks 14A and 16A may be provided with a common inlet header in place of the two headers 38A herein shown and described.

An upper seal plate 202 is secured along one edge portion of each of the inlet headers 38A so as to extend exteriorly of the header. A seal plate 203, similar to seal plates 202, is secured along one edge portion to each of the outlet headers 40A so as to also extend exteriorly of the header. To the distal edge portion of each of the upper seal plates 202 is secured a top wall 20A to provide a fluid tight seal of the upper portion of the evaporative condenser. The sealing of the bottom side portions of the evaporative condenser is achieved by plates 205, each of which are secured to lower seal plate 203 and to an adjacent angle iron member 200. The front portion of the evaporative condenser is closed by a front wall 22A which is secured in a fluid tight manner to top wall 20A, an angle iron 200 of the support frame and to the ends of seal plates 202 and 203. As best shown in FIG. 15, the rear portion of the evaporative condenser is provided with a rear wall 18A, which is secured as front wall 22A, in a fluid tight manner to top wall 20A, an angle iron 200 of the support frame, and to the ends of seal plates 202 and 203. The tube banks 14A and 16A, top wall 204, front wall 22A, and rear wall 18A, together with base 12A define therebetween a substantially triangular plenum or chamber 24A.

To provide for the passage of air into plenum 24A and out through tube banks 14A and 16A, front wall 22A is provided with an opening 54A in which a fan 74A is supported by a bracket assembly comprising two spaced U-shaped rods 205 and a platform 206 extending between rods 205, the fan being driven by a motor 207 secured to platform 206. To provide the advantages of absorption of heat by the vaporization of water, a means for wetting the tubes 42A of each of the tube banks 14A and 16A is incorporated in the apparatus 10A. As best shown in FIGS. 13 and 16, each of the wetting means comprises a distribution manifold 208 supported by seal plates 202 and 203 in close, spaced, parallel relationship to tube banks 14A and 16A and a plurality of spaced branch pipes 209. At the end of each of the branch pipes is mounted a spray nozzle 210 positioned to direct a stream of water against tubes 42A of tube banks 14A and 16A. Another set of spray nozzles 211 is connected at spaced intervals to distribution manifold 208, which nozzles are also positioned to direct streams of water against tubes 42A. The upper end of distribution manifold is sealed as by a cap 212 while the opposite or lower end is connected to a source of water under pressure (not shown), such as water pumped from sump 34A to which make-up water may be added through a float controlled supply pipe similar to that described with respect to the embodiment shown in FIGS. 1 to 10.

Exteriorly of each of the distribution manifolds 208, a draft eliminating and disentrainment baffle assembly 213 is supported by seal plates 202 and 203, front wall 22A and rear wall 18A. As shown in FIGS. 13 and 14, assembly 213 comprises a frame 214 and a plurality of spaced, parallel, baffles or slats 215 formed to cause the air to follow tortuous paths therethrough. The baffles or slats 215 function to disentrain water from the air by the impingement of the air against portions of the slats in the line of direct flow. Similarly, drafts of ambient air or recirculation discharged air from one side into the other is prevented by assemblies 213, which eliminate direct communication between the interior of the apparatus and the surrounding atmosphere.

It is also contemplated by the present invention to provide, if desired, a second fan in rear wall 18A, similar to fan 74A, and provide a partition disposed within plenum 24A to divide it into two subchambers with each fan providing for flow of air through the subchambers.

In operation of the evaporative condenser 10A, a fluid, such as gaseous refrigerant, is delivered to each of the inlet headers 38A through supply pipes 98A. From headers 38A, the fluid flows into and through tubes 42A and thence into outlet headers 40A. Simultaneously with flow of fluid through tubes 42A ambient air is drawn into plenum 24A by fan 74A and forced through the banks of tubes 42A and, thereby, in indirect heat exchange relationship with the fluid in tubes 42A. Also, tubes 42A are wetted by water sprayed from nozzles 210 and 211 of distribution manifold 208 and branch pipes 209. Disentrained water and other unevaporated water drop from the slats 215 and pipes 42A and flow into sump 34A. Make-up water is supplied to the reservoir or sump 34A by suitable means, not shown. The cooled or condensed fluid flows from each of the outlet headers 40A via pipes 100A and main discharge pipe 201.

It is now believed readily apparent that the present invention provides an evaporative condenser of compact construction and possessing high efficiency.

Although various embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A heat exchanger of the type where ambient air is passed in indirect heat exchange relationship with another fluid comprising
    (a) a base,
    (b) two banks of tubes supported in general upright position by said base,
    (c) said two banks being disposed in converging-diverging planes,
    (d) wall means associated with said two tube banks and said base to define an overall generally triangular configuration and a generally triangularly shaped chamber,
    (e) fan means in said wall means for forcing ambient air into said chamber and between the tubes of said tube banks to atmosphere,
    (f) means for delivering fluid to the tube banks for flow through the tubes in indirect heat exchange with the air flowing between the tubes, and
    (g) outlet means connected to said tube banks to conduct fluid away from the tubes after it has passed in heat exchange relationship with the air.

2. The apparatus of claim 1 wherein means for wetting the exterior surfaces of the tubes of said tube banks is provided.

3. The apparatus of claim 1 wherein said two tube banks lie in converging-diverging planes which are at acute angles to the base and the converging portion of the tube banks is above the base.

4. The apparatus of claim 1 wherein each of said tube banks include an inlet and an outlet header of triangular shape in cross section.

5. The apparatus of claim 1 wherein said tube banks include an inlet header of triangular shape in cross section.

6. The apparatus of claim 1 wherein said wetting means comprises a main supply pipe for each tube bank supported in spaced parallel relationship to the tube bank and a plurality of spaced secondary pipes connected to said main supply pipe, and spray nozzles connected to the supply and secondary pipes to direct stream of water against the tube bank to wet the surfaces of the tubes of the tube bank.

7. In the apparatus of claim 1 means for wetting the exterior surfaces of the tubes of the tube banks.

8. The apparatus of claim 1 wherein draft eliminating means is disposed adjacent the exterior of each of the tube banks.

9. An evaporative type heat exchanger comprising
 (a) a base having means defining a reservoir for liquid,
 (b) two banks of vertically extending tubes supported by said base,
 (c) said two banks being disposed in converging-diverging vertical planes,
 (d) first wall means for sealing the space between the converging ends of the tube banks,
 (e) second wall means disposed in the space between the divergent ends of the tube banks to seal such space,
 (f) a plate means sealingly connected to the tube banks and the first and second wall means to define with the base a plenum, said base, wall, and plate means defining an overall generally triangular configuration and a generally triangularly shaped chamber,
 (g) means for wetting the exterior surfaces of the tubes of said tube banks,
 (h) fan means in said second wall means for forcing ambient air into said plenum and between the tubes of said tube banks to atmosphere,
 (i) means for delivering fluid to be cooled to the tube banks for flow through the tubes in indirect heat exchange with the air flowing between the tubes, and
 (j) outlet means connected to said tube banks to conduct cooled fluid to a place of use.

10. The apparatus of claim 9 wherein each of said tube banks comprises an inlet header and an outlet header with the outlet header disposed adjacent the base and in said reservoir of liquid.

11. The apparatus of claim 9 wherein draft eliminating means is disposed adjacent the second wall means and each of the tube banks.

12. The apparatus of claim 9 wherein disentrainment means is disposed adjacent each of the tube banks to remove liquid entrained in the air after the air passes said tube banks.

13. The apparatus of claim 9 wherein a portion of said second wall means is hinged to permit access in the plenum.

14. The apparatus of claim 9 wherein said wetting means comprises a spray nozzle assembly disposed in the plenum and arranged to direct liquid spray upwardly in the plenum closely adjacent each of the tube banks.

15. The apparatus of claim 9 wherein baffle means is disposed in the plenum to provide substantially uniform air flow through the two tube banks.

16. The apparatus of claim 9 wherein said wetting means comprises for each bank of tubes a manifold having a plurality of nozzles positioned to direct a spray of liquid upwardly and toward the associated tube bank.

17. The apparatus of claim 11 wherein draft eliminating cover members are secured adjacent the second wall means to minimize the drawing of ambient air by the fan means from above the unit.

18. The apparatus of claim 9 wherein draft eliminating cover members are hinged adjacent each of the tube banks to direct air flow after passage between the tubes of the associated tube bank upwardly to atmosphere.

19. The apparatus of claim 9 wherein said base has upstanding walls and an upstanding partition extending between the walls to define a dry space and a liquid sump.

20. An evaporative type heat exchanger comprising
 (a) a base having upstanding walls to define a sump for hold-up of liquid and a dry space,
 (b) two banks of vertically extending tubes disposed in relation to each other in converging-diverging vertical planes,
 (c) each of said tube banks comprising
  (1) an inlet header connected to receive fluid to be cooled from a source thereof,
  (2) an outlet header connected to discharge cooled fluid,
  (3) a plurality of rows of spaced parallel tubes extending between and communicating with the inlet and outlet headers,
 (d) said two tube banks being supported by the base with the outlet headers disposed in the sump to be submerged in the liquid hold-up in the sump,
 (e) first vertical wall means for sealing the space between the convergent ends of the tube banks being disposed in said space and connected to each of said tube banks,
 (f) second vertical wall means having an opening therein disposed in the space between the divergent ends of the tube banks and sealingly connected to the tube banks,
 (g) a top plate sealingly connected in a fluid tight manner to the top portions of each of the tube banks and the first and second vertical wall means to define with said sump a plenum,
 (h) spray nozzle means disposed in said plenum adjacent each of said tube banks to direct a stream of liquid upwardly and toward the tubes to wet the outer surfaces of the tubes, and
 (i) a fan disposed within said opening in said second vertical wall means for forcing ambient air into said plenum and between the tubes of said tube banks and in indirect heat exchange relationship with the fluid flowing in said tubes to cool the latter fluid.

21. The apparatus of claim 20 wherein said top plate is sealingly secured to each of the inlet headers of the tube banks.

22. The apparatus of claim 20 wherein a first draft eliminating cover having a louvered opening is hingedly secured adjacent the second vertical wall means and a draft eliminating cover having a louvered opening is hingedly secured adjacent each of the tube banks, said louvered openings being constructed and arranged to minimize the possibility of recirculation of discharged air back into the plenum through the second vertical wall means.

23. The apparatus of claim 20 where a hinged part of the second vertical wall means is hingedly mounted on the other portion of the second wall means and the fan is mounted on such hinged part so as to move with the hinged part thereby providing quick and easy access to the plenum for inspection and/or repair.

24. The apparatus of claim 20 wherein a pump and drive motor are disposed in the dry space of the base and wherein said pump is connected to withdraw water from the sump and deliver the same to the spray nozzle means for discharge.

25. The apparatus of claim 20 wherein a disentrainment means is disposed adjacent each of the tube banks to receive air flowing past the tube banks to remove the entrained water before discharge to atmosphere.

26. The apparatus of claim 20 wherein baffle means is disposed in the plenum to distribute air flow so that a substantially uniform flow of air through each of the tube banks is achieved.

References Cited
UNITED STATES PATENTS

| | | | |
|---|---|---|---|
| 2,166,397 | 7/1939 | Deverall | 62—305 |
| 3,112,621 | 12/1963 | Dart | 62—305 |
| 3,165,902 | 1/1965 | Paugh | 62—305 |
| 3,384,165 | 5/1968 | Mathews | 165—122 |

WILLIAM J. WYE, Primary Examiner